United States Patent [19]

Ungerboeck

[11] Patent Number: 5,132,963
[45] Date of Patent: Jul. 21, 1992

[54] ECHO CANCELLING DEVICE PROVIDING ADJUSTMENT OF THE ECHO CANCELLER COEFFICIENTS DURING FULL-DUPLEX TRANSMISSION

[75] Inventor: Gottfried Ungerboeck, Langnau am Albis, Switzerland

[73] Assignee: International Business Machines Corp., Armonk, N.Y.

[21] Appl. No.: 522,333

[22] Filed: May 11, 1990

[30] Foreign Application Priority Data

Jun. 22, 1989 [EP] European Pat. Off. ........ 89480101.8

[51] Int. Cl.$^5$ .............................................. H04B 3/23
[52] U.S. Cl. .................................... 370/32.1; 379/410
[58] Field of Search ............... 370/32.1, 6, 24, 32; 379/410, 406, 411

[56] References Cited

U.S. PATENT DOCUMENTS

| | | | |
|---|---|---|---|
| 4,232,400 | 11/1980 | Yamamoto et al. | 370/32.1 |
| 4,887,257 | 12/1989 | Belloc et al. | 370/32.1 |
| 4,887,258 | 12/1989 | Belloc et al. | 370/32.1 |
| 4,970,715 | 11/1990 | McMahan | 370/32.1 |
| 4,987,569 | 1/1991 | Ling et al. | 370/32.1 |

FOREIGN PATENT DOCUMENTS

0054609 6/1982 European Pat. Off. .

OTHER PUBLICATIONS

Nachrichtentechnische Zeitschrift N.T.Z., vol. 36, No. 11, Nov. 1983, pp. 726-732, Berlin, DE; W. Grosch et al., "Ein Vollduplexmodem mit adaptiver Sprecherecholoschung zer Ubertragung von 4800 bit/s uber Fernsprechkanale".

IEEE Transactions on Communications, vol. COM-30, No. 9, Sep. 1982, pp. 2095-2108, New York, Agazzi et al., "Large-Scale Integration of Hybrid-Method Digital Subscriber Loops".

*Primary Examiner*—Douglas W. Olms
*Assistant Examiner*—Alpus H. Hsu
*Attorney, Agent, or Firm*—Edward H. Duffield

[57] ABSTRACT

In the echo-cancelling device of the invention new decision-error directed algorithms are developed which permit to maintain adaptivity of the echo coefficients and perform precise tracking of the far-end echo phase in a computationally efficent manner during full-duplex operation. The echo-cancelling device comprises an adjust device (40) performing the minimization of the mean-square error obtained as the difference between the signal at the output of the equalizer (Z) and the data-symbol decision (â), for providing the adjustment of the near echo estimator (20) coefficients, of the far echo estimator (22) coefficients, and of the phase (26) of the estimated far echo.

4 Claims, 3 Drawing Sheets

ECHO CANCELLING DEVICE PROVIDING ADJUSTMENT OF THE ECHO CANCELLER COEFFICIENTS DURING FULL-DUPLEX TRANSMISSION

FIELD OF THE INVENTION

The present invention deals with the data transmission in full duplex on a two-wire line, and relates particularly to a device for cancelling echoes of the outgoing data signals due to the connections between the two-wire and four-wire line portions, providing adjustment of the echo canceller coefficients during full-duplex transmission.

PRIOR ART

A family of modems is for use on connections between data terminal equipments by means of the switched telephone network. The data signals are transmitted from a transmitting modem to a receiving modem over a two-wire line. For long distances, amplifiers (repeaters) are required. Since amplifiers only operate in one direction, the data directions are split up to separate the two-wire line into a four-wire line. The connection between two and four wire lines, and vice-versa, is made through so called hybrid couplers. Likewise, an hybrid coupler is required to connect the modem output comprising the transmitting circuit and the receiving circuit, to the two-wire line.

An hybrid coupler is a terminating set consisting of two differential transformers with three inputs, an input for each two-wire circuit of the four-wire line, and an input for the two-wire line. Because these transformers cannot be loaded with an impedance matched throughout the overall frequency bandwidth, a portion of the data signal energy goes over to the other direction and returns to the sender through the two-wire line, generating so called echoes.

Two kinds of echoes are received by the modem: the near echo resulting from the transmitted data signal leaking directly through the modem hybrid coupler toward the receiving circuit of the modem, and the far echo resulting from the transmitted data signal passing through the four-wire line and reflecting on a far hybrid coupler.

Therefore, the modems of this type are provided with echo cancellers to cancel from the incoming signal echoes of the outgoing signal. Because near and far echoes have different characteristics, it is classical to have the near echo canceller different from the far echo canceller, the outputs of both echo cancellers being added to provide an estimated value of the actual echo. This resulting estimated value is then subtracted from the incoming signal to provide theorically the incoming signal free of echo. The error signal between the estimated and actual values of the echo is generally used to adjust the coefficients of the echo cancellers.

In fact the echo cancellers of the prior technique present many drawbacks. Indeed, the data signal processing in the present day modems is performed digitally under the control of one or several processors incorporated in the modem. Accordingly, all the operations of echo cancelling are carried out digitally resulting in an estimated echo value in digital form. This estimated value has then to be converted into analog form before being subtracted from the incoming signal, to become the modem receive signal. The resulting signal has, in turn, to be converted into digital form so as to be used to extract the data and as a control signal for adjusting the echo canceller and equalizer coefficients, and carrier phase, phase roll tracking. Further to require the existence of one digital-to-analog converter to convert the estimated echo value, and again an analog-to-digital converter to provide the modem receiver with the echo-free digital signal. Such an echo canceller requires the use of a programmable gain amplifier to fit the wide energy level range of the incoming signal. Furthermore, the digital-to-analog converter which converts the estimated echo value into analog form, introduces a frequency distortion (of type $sinX/X$) which has to be subsequently corrected.

The above drawbacks have been overcome by the invention described in U.S. Pat. No. 4,887,257 which relates to an echo cancelling device wherein the circuit path used for generating the control signal enabling the adjustment of the echo canceller coefficients, is separated from the circuit path used for generating the echo-free remote incoming signal. But, as in the previous technique, such an echo cancelling technique also requires the use of a digital-to-analog converter for converting the estimated echo value into analog form before subtracting the value from the incoming signal and an analog-to-digital converter for converting the analog incoming signal into digital form so that it can be processed for obtaining the control signal adjusting the echo canceller coefficients.

The echo cancelling device described in U.S. Pat. No. 4,887,257 as well as the echo cancelling devices of the prior technique, perform the adjustment of the echo canceller coefficients at the beginning of the data transmission when a training sequence is sent from the local modem to the remote modem while the latter modem does not transmit any information. The coefficients are then frozen during the data exchange between the two modems. Besides, most today modems of this type could not cope with significant amounts of frequency shift of the far-end echo (phase roll). In these modems, the far-end echo phase is tracked by an algorithm which adjust the estimated echo phase so as to minimize the power of the residual receive signal after echo cancellation. This approach cannot work well in the presence of a remote modem signal during full-duplex operation (the usual "double talk" problem) with echo cancellers. Such an approach can in principle also be used for fine adjustment of the echo estimator coefficients during full-duplex operation, but it leads to poor convergence for the same reason.

OBJECTS OF THE INVENTION

Therefore, the main object of the invention is an echo cancelling device which permits, during full-duplex operation, to maintain the adaptivity of the near and far echo estimator and to perform precise tracking of the far-end echo phase, the so-called phase-roll.

Another object of the invention is an echo cancelling device incorporated in a modem wherein the digital residual value after the echo cancellation, is interpolated using the timing derived from the outcoming signal, thereby saving the use one digital-to-analog converter and one analog-to-digital converter which are required in the present modems.

BRIEF SUMMARY OF THE INVENTION

These objects and others are provided by an echo cancelling device in a data transmission system connected to a two-wire line portion of a transmission medium over which the transmission of an analog outgoing signal can be made simultaneously with the reception of an analog incoming signal, wherein the incoming signal is composed of a signal received from a remote system and an echo signal produced by the transmission medium in response to the outgoing signal, the data transmission system comprising a transmitter providing outgoing signal and a receiver receiving the incoming signal, and including an equalizer and data decoding means providing data-symbol decisions. Such an echo cancelling device providing a generated echo signal from the incoming signal and subtracting the generated echo signal from the incoming signal, comprises a near echo estimator for generating an estimated near echo signal, a far echo estimator for generating an estimated far echo signal, phase rotating means for rotating the phase of the estimated far echo signal in order to compensate the phase roll due to the transmission medium, and an adder for adding the estimated near echo signal and the phase-roll corrected far echo signal at the output of the phase rotating means and therefore providing the estimated echo signal. It also comprises an adjusting device for adjusting the coefficients of the near echo estimator, the coefficients of the far echo estimator and the phase rotating means while transmission of the outgoing signal is made simultaneously with the reception of the incoming signal, the adjusting device performing the minimization of the mean-square decision error obtained as the difference between the signal at the output of the equalizer, and the data-symbol decision.

The echo cancelling device of the invention is such that, whereas all the functions performed by the transmitter, all the operations of the near echo and far echo estimators, and the front-end functions performed by the receiver for converting and filtering the incoming signal, are carried out using the transmitter timing, an interpolator receives the residual received signal from which the estimated echo signal has been removed, and resamples the signal by interpolation using the timing derived from the incoming signal.

BRIEF DESCRIPTION OF DRAWING

The invention will be more apparent from the following description of a preferred embodiment of the invention as illustrated in the accompanying drawings wherein.

DESCRIPTION OF PREFERRED EMBODIMENT

Figure 1:
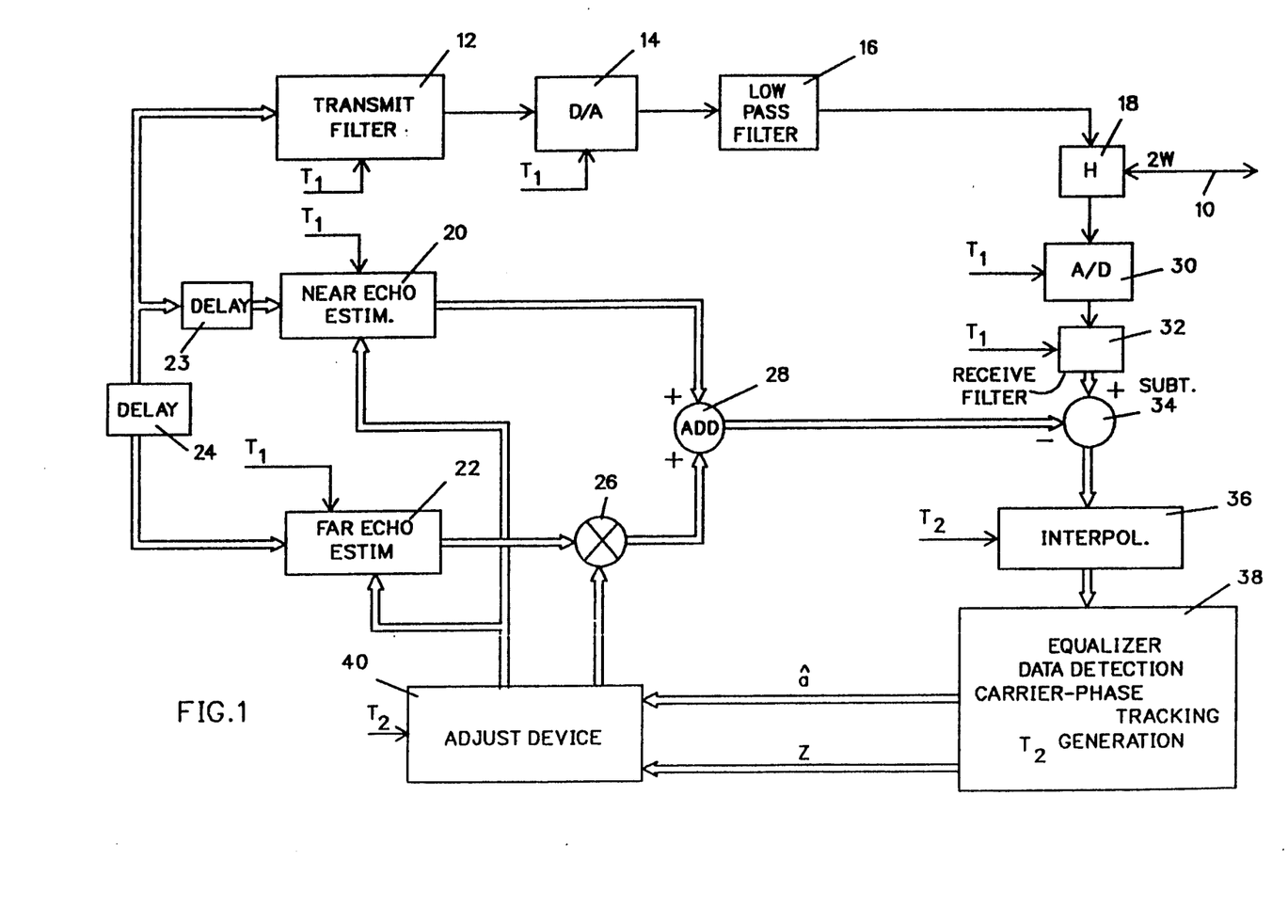
FIG. 1 is a block diagram of the portion of a modem incorporating an echo cancelling device according to the invention.

FIG. 1 is a block diagram of an echo cancelling device used with a modem transmitting over a two-wire medium. The digital signal in complex form, that is with the in-phase and quadrature components, is provided to the two-wire line 10 via transmit filter 12, digital-to-analog converter 14, low pass filter 16, and hybrid coupler 18. It must be noted that the output of transmit filter 12 is a real signal and is shown as one line, whereas the complex signal at its input is shown as a double line. Such a representation will be used for all the drawings.

As echoes arise due to impedance mismatches in the hybrid couplers such as 18, the incoming signal received on line 10 is composed of three different signals: the far signal transmitted from the remote modem, the near echo resulting from the outgoing signal leaking directly through hybrid 18, and the far echo resulting from the transmitted signal reflecting on a far hybrid coupler.

Because near and far echoes have different characteristics, it is convenient to break the echo cancelling device into two parts, the near echo estimator 20 and the far echo estimator 22 (which are functionally transversal filters). A delay 23 is located at the input of near echo estimator 20 and a delay 24 (equal to the round trip delay) is located at the input of far echo estimator 22.

As the far echo is affected by a frequency shift due to the frequency changes in the 4-wire carrier system, some phase-roll tracking is needed. Therefore, a phase correction signal of the form $\exp(J\phi)$ used as multiplying factor of the estimated far echo signal in multiplier 26.

Then, the outputs of near echo estimator 20 and multiplier 26 are added in adder 28. The resulting signal, which is the estimated value of the echo (near and far) is subtracted from the digitally-converted incoming signal received from the 2-wire line 10, via hybrid coupler 18, analog-to-digital converter 30, and receive filter 32, in subtracter 34.

It must be noted that the means of FIG. 1 which have just been described are all synchronized by Timing 1 (indicated T1 on the Figure) which corresponds to the transmitter timing. Therefore, the samples of the signal are provided at the output of subtracter 34 according to a synchronization based on Timing 1 and cannot be processed by the receiver part of the modem which is synchronized on the remote signal at Timing 2. It is why the signal samples are interpolated by interpolator 36 to provide new samples synchronized on Timing 2.

Then, the signal samples produced at Timing 2 by interpolator 36 are supplied to block 38 which corresponds to all the receiver functions such as equalizing, data detection, carrier-phase tracking . . . and also Timing 2 generation. Note that these functions are classical in the modem, and therefore will not be described.

As shown on FIG. 1, two complex values â and Z are provided by the receiver block 38. â is the symbol decision and Z the signal provided at the output of the equalizer. These two values are used as inputs to adjust device 40 which provides the adjustment of the near and far echo estimator coefficients, and the adjustment of the multiplying factor of the echo phase in multiplier 26. The functions performed by block 40, object of the invention, will be described in detail later.

As a result of the development of integration techniques employed in the electronic field, today modems are provided with microprocessors which use sophisticated signal processing algorithms. Thus, the following description relates to the implementation of the invention by means of a special digital processor, called the digital signal processor (or DSP).

In the description of the signal processor algorithms, quantities given in capital letters usually represent variables, constants or labels that are used in the software of the signal processor. Quantities given in lower case indicate mathematical symbols which can differ from corresponding quantities in the modem by a scaling factor, or may not have a direct equivalent.

TIMING FUNCTIONS

The analog-to-digital (A/D) and digital-to-analog converters of the modem interface convert the incoming and outgoing signals synchronously at the rate of 9600 samples per second. The sample timing of these signals is referred to as Timing-1. At this timing, transmitter functions, receiver front-end functions, and echo cancellation are performed. The transmitter produces transmit symbols at a rate of 2400 bauds, and through modulation and transmit Hilbert filtering generates transmit signals at rate 9600 s/s. With the same timing, receive signals are obtained, input-gain control is performed, and the receive signals are converted to a complex baseband signal with sampling rate 4800 s/s through receive Hilbert filtering and demodulation. Finally, from transmit symbols near-end and far-end echo signals are generated at complex baseband with sampling rate 4800 s/s, and subtracted from the receive signal.

The residual received signal is then resampled by interpolation to obtain a signal with Timing-2. At this timing, the remaining receiver functions are performed. The Timing-2 sampling phase is derived from the remote-modem signal. The modulation rates of the local and remote modems can differ. In the worst case, the resulting phase drift between Timing-1 and Timing-2 functions corresponds to a rate difference of $\pm 2 \times 0.01\%$.

An interrupt routine for Timing-1 is executed during every modulation interval of $T = 1/2400$ second for transmitting 4 samples TSAMP(0,1,2,3; IS1) and for receiving 4 samples RSAMP(0,1,2,3;IS1) transferred, respectively, between the D/A and A/D converters and buffers in the DSP memory. The index IS1 indicates even (IS1=0) and odd (IS1=1) modulation intervals for Timing-1. The interrupt routine inverts IS1 after the transfer of TSAMP(3;IS1) and RSAMP(-3;IS1). The interrupt routine provides also a time stamp STIME1(IS1) indicating the sampling time of TSAMP(0;IS1) and RSAMP(0;IS1). Interface lines for data transmission are serviced once per modulation interval, when the samples TSAMP(0;IS1) and RSAMP(0;IS1) are transferred.

The interrupt routine for Timing-2 operates 2400 times per second, and controls the interface lines for data reception. Index IS2 is used to indicate even (IS2=0) and odd (IS2=1) modulation intervals for Timing-2. The routine provides a time stamp STIME2-(IS2) for each modulation interval and uses a timing correction value provided by the timing-recovery function in the main-control program, to adjust the phase of the Timing-2 process.

The interrupt routines indicate by IS1 and IS2 to the main-control program the modulation intervals (Timing-1 and Timing-2, even or odd) for which they perform I/O operations. The main-control has to process data or provide data for the modulation intervals indicated by the complement values of IS1 and IS2 before the interrupt routines turn to these values.

The main program deals directly with interface lines CTL (connect-to-line) and CIN (call indication), and ring indication from the line interface. The decision for operation as calling or answering modem is made as part of the initialization program, by observing CTL and ring indication, and setting CIN accordingly. After normal initialization, or partial reinitialization when certain error conditions occurred, the main-control program is started.

Indices MS1 and MS2 are used to indicate even and odd modulation intervals for which Timing-1 and Timing-2 functions are to be performed. By observing the advancement of the indices IS1 and IS2, the main-control program determines when to start processing for the next Timing-1 or Timing-2 modulation interval. For example, when the value of IS1 changes from 0 to 1, the main-control program is allowed to perform Timing-1 functions for MS1=0, while the interrupt program performs functions for IS1=1. The variable MODE designates the current state in the signaling protocol. It determines which mode-specific control and signal-processing tasks are to be executed. Only Timing-1 tasks can change the value of MODE.

When MS1=IS1, Timing-1 processing for the next modulation interval can begin. The sampling time STIME1(MS1) is recorded in TIME1. A routine operates on the receive samples RSAMP(0,1,2,3;MS1), and performs receive filtering, demodulation, and input-gain control. Eventually, two demodulated complex-baseband signals, with sampling rate 4800 s/s, are entered into a delay line X1. Depending on MODE, several specific Timing-1 tasks are executed. Each task executes a particular routine which generates transmit samples TSAMP(0,1,2;MS1). Other tasks deal with tone detection, echo cancellation, etc. . . . After completion, the delay line X1 contains the received baseband signal up to time TIME1, ready for Timing-2 processing. CTL (connect-to-line) is checked, and MS1 is inverted.

When MS2=IS2, processing for the next Timing-2 modulation interval can begin. The routine INTX1X2 computes from the signals in delay line X1 two interpolated signals, again with sampling rate 4800 s/s, which are entered into a delay line X2. Interpolation is performed according to the time difference STIME2(MS2)-TIME1. The delay line X2 then contains signals up to sampling time STIME2(MS2). A routine performs band-edge timing recovery from the X2 signals and computes a time-correction value RTIMCO, which is used by the Timing-2 interrupt routine to adjust the phase of the Timing-2 process. Further functions are equalization, carrier-phase tracking, signal detection, etc. . . . During full-duplex operation, efficient decision-error directed algorithms are employed to adjust at reduced rate the echo-coefficients, and to track the far-end echo phase according to the invention as described later. Finally, MS2 is inverted.

ECHO CANCELLATION

In the present implementation, the time span of the near-end and far-end echo cancellers is 16 T (6.67 msec) and 32 T (13.33 msec). The coefficient spacing is T/2. Hence, there are 32 near-end echo coefficients $c_{NEC}(k), k=0, \ldots 31$, in the near echo estimator and 64 coefficients $c_{FEC}(k), k=0, \ldots 63$ in the far echo estimator.

The estimated near-end $x_{NEC}$ and far-end $x_{FEC}$ echo signals are obtained by $$x_{NEC}(2n - 1 + i) = \sum_{k=0}^{15} c_{NEC}(2k + i)a(n - k - D_{NEC}), i = 0,1,$$

$$x_{FEC}(2n - 1 + i) =$$

-continued
$$\left[\sum_{k=0}^{31} c_{FEC}(2k+i)a(n-k-D_{FEC})\right]e^{+j\phi_{FEC}}, i=0,1,$$

where $\phi_{FEC}$ denotes the far-end echo phase and $D_{NEC}$ and $D_{FEC}$ denote the near-end and far-end echo delays.

The sum of these signals, multiplied by the internal echo gain $g_{ECH}$, represents the estimated echo $$x_{ECH}(2n-1+i)=g_{ECH}[x_{NEC}(2n-1+i)+x_{FEC}(2n-1+i)], i=0,1,$$

where $g_{ECH}=1$ during training, and $g_{ECH}\leq 1$ during FDX operation.

Subtraction of the estimated echo from the most recent signals in delay line X1 and multiplication by the internal "equalizer" gain $g_{EQZ}$ yields $$x_1(2n-1+i)=g_{EQZ}[x_0(2n-1+i)-x_{ECH}(2n-1+i)], i=0,1,$$

where $g_{EQZ}=1$ during echo training.

For full-duplex operation, a value $g_{EQZ}\geq 1$ is determined such that the residual receive signal achieves a gain approximately unit power:

$$E\{|x_1(2n-1+i)|^2\}\approx 1, i=0,1.$$

The signals $x_1(2n-1)$ and $x_1(2n)$ replace in delay line X1 the signals $x_0(2n-1)$ and $x_0(2n)$ which were the received complex baseband signals before echo cancellation. During operational phases without echo cancellation, $x_1(k)=x_0(k)$.

A routine stores also $$x_{1FEC}(2n-1+i)=g_{FEC}x_{FEC}(2n-1+i)/4, i=0,1,$$

in a delay line for later use. The far-end echo gain $g_{FEC}$ is determined during echo training.

ECHO-CANCELLING TRAINING

During echo training, only the echoes from the transmitted training sequence are received. The near-end and far-end echo coefficients, $c_{NEC}(k)$, $k=0,\ldots,31$, and $c_{FEC}(k)$, $k=0,\ldots,63$, are centered and adjusted to minimize the mean-square value of the residual receive signal, $E\{|x_1(2n-1+i)|^2\}$, $i=0,1$. The far-end echo phase $\phi_{FEC}$, is tracked and frequency shift is estimated.

The program checks every 16 modulation intervals alternately the near-end and far-end echo coefficients. If one of the conditions $$\sum_{k=0}^{3}|c_{NEC}(k)|^2 - \sum_{k=28}^{31}|c_{NEC}(k)|^2 \begin{cases} > +2^{-14}: \text{shift right,} \\ < -2^{-14}: \text{shift left,} \end{cases}$$

$$\sum_{k=0}^{7}|c_{FEC}(k)|^2 - \sum_{k=56}^{63}|c_{FEC}(k)|^2 \begin{cases} > +2^{-14}: \text{shift right,} \\ < -2^{-14}: \text{shift left.} \end{cases}$$

is met, the respective echo coefficients are right- or left-shifted by one modulation interval and the associated echo delay is decremented or incremented by one. A corresponding change is also made for the associated echo-symbol delay line NTA or FTA.

Tests are included to ensure $$0\leq D_{NEC}, 20\leq D_{FEC}.$$

A forced right-shift of the near-end echo coefficients is made, and $D_{NEC}$ is decremented by one, if $$0<D_{NEC} \text{ and } D_{NEC}+16\geq D_{FEC}.$$

The last condition indicates overlap of the 16-T time span of the near-end echo canceller with the 32-T time span of the far-end echo canceller.

The echo estimator coefficients are updated during every modulation interval.

$$c_{NEC}(2l+i)\leftarrow c_{NEC}(2l+i)+a'_{ECH}x_1(2n-1+i)a^*(n-l-D_{NEC}), l=0,\ldots,15,$$

$$c_{FEC}(2l+i)\leftarrow c_{FEC}(2l+i)+a'_{ECH}x_1(2n-1+i)a^*(n-l-D_{FEC})e^{-j\phi_{FEC}}, l=0,\ldots,31,$$

for $i=0,1$.

The asterisk (*) denotes complex conjugation.

As far as the adjustment of the far-end echo phase is concerned, the program computes alternately for $i=0$ and 1 (i=n mod 2)

$$x'_1(n)=g_{FEC}x_1(2n-1+i) \text{ limited to } \pm 2\pm 2j,$$
$$x'_{FEC}(n)=x_{FEC}(2n-1+i)g_{FEC}/4.$$

The far-end echo phase and frequency shift are estimated by the second-order phase-locked loop algorithm $$\Delta\phi_{FEC}\leftarrow Im[x'_1(n)x'^*_{FEC}(n)],$$

$$\Delta\phi_{FEC,LPF}\leftarrow \tfrac{3}{4}\Delta\phi_{FEC,LPF}+\Delta\phi_{FEC}(LPF \text{ with gain } 4 \text{ and time constant } 4\ T),$$

$$\phi_{FEC}\leftarrow \phi_{FEC}+\gamma_{FEC}\Delta\phi_{FEC,LPF}+\Delta\phi_{FEC,s}(\text{mod } 2\pi),$$

$$\Delta\phi_{FEC,s}\leftarrow \Delta\phi_{FEC,s}+\zeta_{FEC}\Delta\phi_{FEC,LPF},$$

where $\Delta\phi_{FEC,LPF}=2\pi\Delta f_{FEC}/T$ represents the estimated phase increment per modulation interval introduced by frequency shift of the far-end echo ("phase roll").

The echo canceller training is completed when the best possible echo suppression has been achieved, at least when the training sequence has been sent for a minimum duration (1280 T = 533 ms), or when the maximum duration of 8192 T is exceeded.

INTERPOLATION

Interpolation is the first function to be performed when MS2≠IS2 indicates readiness to execute receiver functions at Timing-2. Delay line X1 contains complex baseband signals sampled at 4800 s/s (2/T) with Timing-1. The most recent two X1 signals $x_1(2n-1)$, $x_1(2n)$ are associated with the sampling time recorded in TIME1. The routine INTX1X2 computes two signals $x_2(2n-1)$, $x_2(2n)$ for the sampling time available in STIME2(MS2), and enters them into delay line X2. Indices INTI and INTJ computed by INTX1X2 for this operation are stored for later use by the routine FDX_UPD, which performs additional interpolation functions.

Conceptually, the interpolation is performed by the equation $$x_2(2n - 1 + i) = \sum_l c_{INT}(DTIME, l) x_1(2n - 1 + i - l), i = 0,1, \quad (1)$$

$$x_2(2n - 1 + i) = \begin{cases} \sum_{l=-2}^{2} c_{IP}(INTJ, l) x_1(2n - 1 + i - INTI - l), 0 \leq INTJ \leq 15, \\ \sum_{l=-2}^{2} c_{IP}(32 - INTJ, -l) x_1(2n - 1 + i - INTI + 1 - l), 16 \leq INTJ \leq 31. \end{cases}$$

where the time difference $$DTIME = STIME2(MS2) - TIME1$$

selects an appropriate set of interpolation coefficients.

In the modem implementation, time is measured in DSP cycles (8.064.10 cycles per second). One modulation interval (T) corresponds to $8,064000/2400 = 3360$ cycle times. The function of equation (1) is accomplished by computing integers I and J, which satisfy $$32I + J = \text{floor}[64.DTIME/3360], -15 \leq J \leq 16.$$

The integer I denotes the time difference in units of T/2, and J represents the residual difference in units of T/64, which is the chosen time quantization for interpolation (1.6% of T). For a finite span of the interpolation filter, equation (1) can now be equivalently written as $$x_2(2n - 1 + i) = \sum_{l=-L}^{L} c_{IP}(J, l) x_1(2n - 1 + i + I - M - l), i = 0,1.$$

M being an integer such as a fixed delay M.T/2 is introduced to ensure causality.

The optimum interpolation coefficients for each value can be determined for various values of L, the number of taps in the interpolator. The worst-case interpolation errors occurs for $J = 16$ (T/4 interpolation between T/2 spaced signals). In this case, the ratio of the mean-square error to the signal power was found for $L = 1: -29.9$ dB; $L = 2: -42.2$ dB; $L = 3: -55.8$ dB. Based on these results, $L = 2$ was selected.

Because of the symmetry $$c_{IP}(-J, -l) = c_{IP}(J, l),$$

only the coefficients for $J = 0, \ldots 16$ are needed. Table 1 shows the coefficients for $L = 2$, scaled and rounded to integers $CIP(J, l) = 2048 c_{IP}(J, l)$. The interpolation is performed with unit gain. Hence, the signals in delay line X1 and X2 exhibit the same power.

For the current implementation, $M = 6$ was chosen. The interpolation is performed in a slightly different manner as described above (and will probably be changed to the described form in a later version). Instead of integers I and J, integers 'I' and 'J' satisfying $$32 \cdot I + \cdot J = \text{floor}[64 DTIME/3360], 0 \leq \cdot J \leq 31$$

are calculated and recorded in the form $INTI = 6$-'I' and $INTJ = $ 'J'. With these values the interpolation becomes for $i = 0, 1$:

ECHO CANCELLING DEVICE COEFFICIENT ADJUSTMENT

Figure 2:
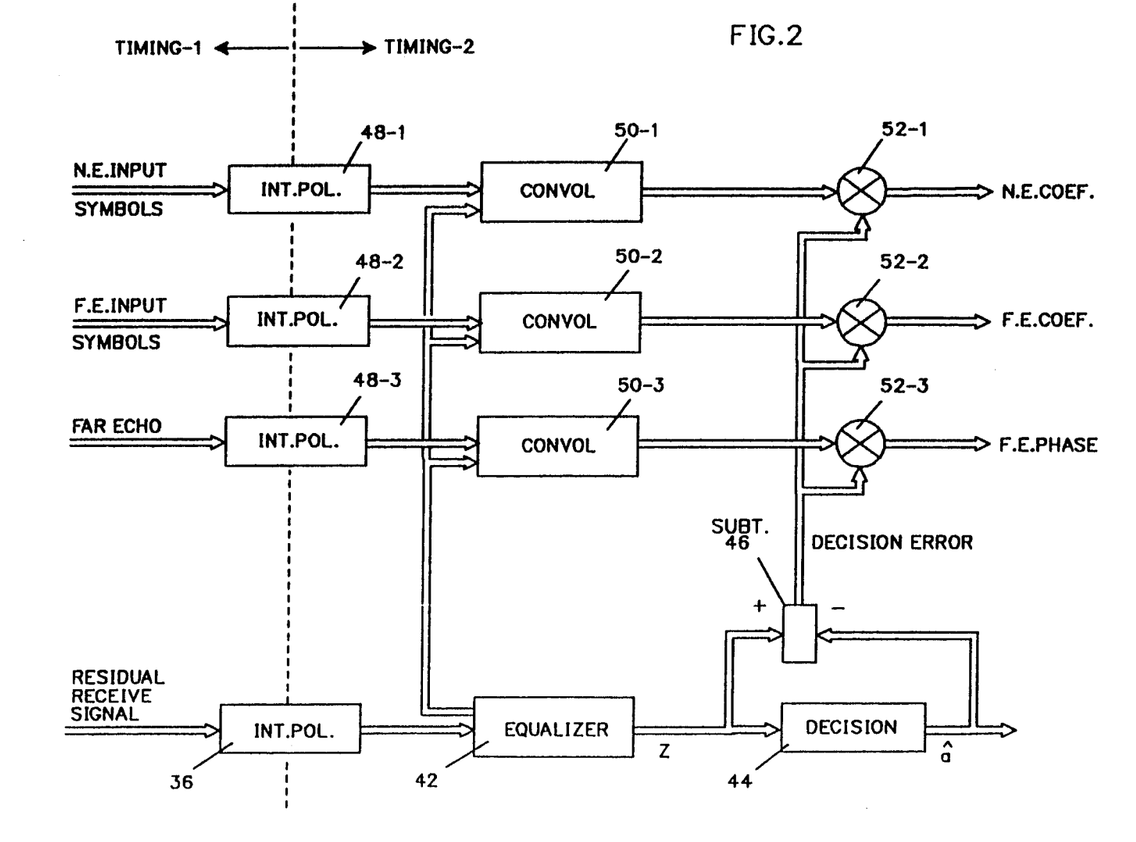
FIG. 2 is a block diagram of a first embodiment of the adjust device included in the echo cancelling device according to the invention.
Figure 3:
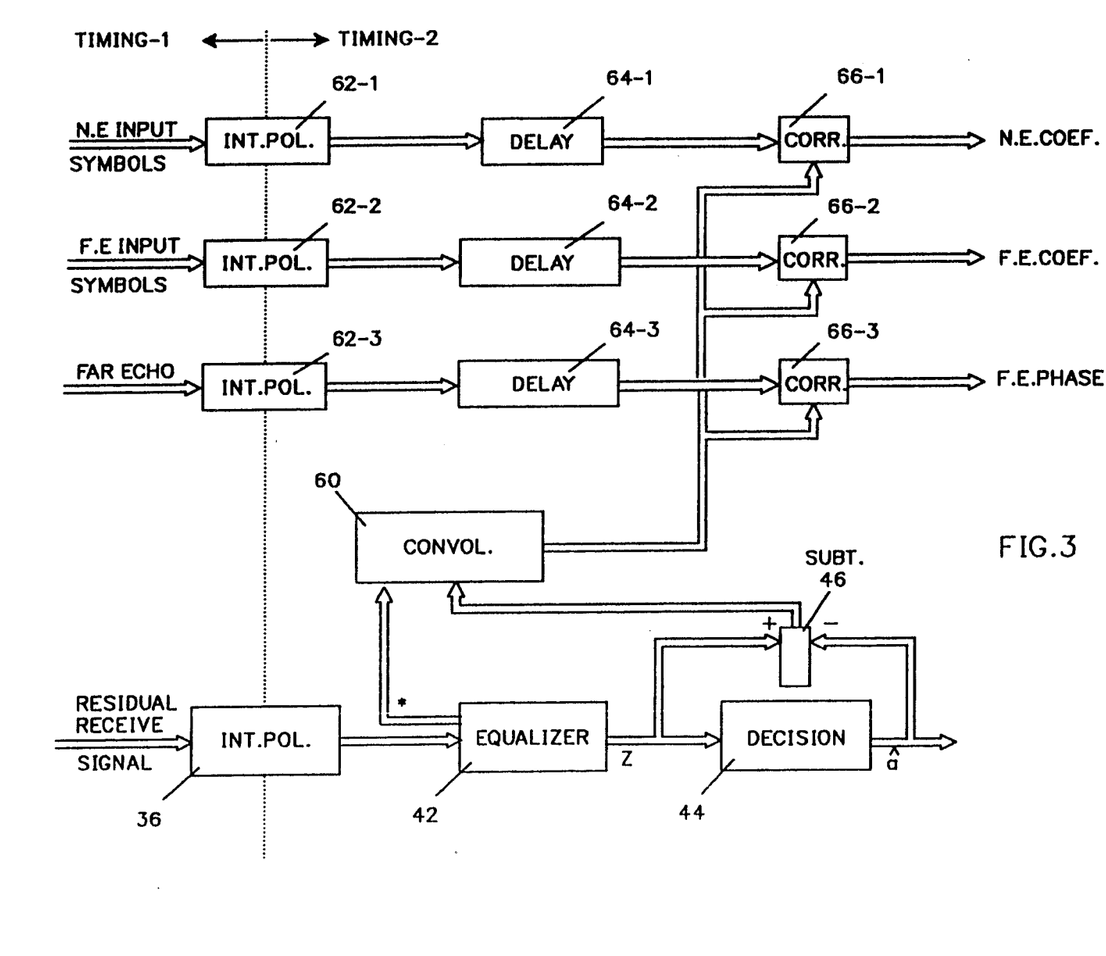
FIG. 3 is a block diagram of a second embodiment of the adjust device included in the echo cancelling device according to the invention.

The main feature of the invention consisting in providing an adjust device able to carry out the adjustments of the echo cancellers device coefficients during the full-duplex operation, is now described in reference to FIGS. 2 and 3.

The process which enables the coefficients of the near echo estimator (20 in FIG. 1), the coefficients of the far echo estimator (22 in FIG. 1) and the phase rotating means (26 in FIG. 1) to be adjusted, is based on the minimization of the mean-square decision error obtained as the difference between the equalized receive signal and data-symbol decisions.

Thus, as shown on FIG. 2, the residual receive signal is interpolated by interpolator 36. Then, the interpolated signal is equalized in equalizer 42 to provide signal samples Z. After data detection, a data-symbol decision â is provided at the output of decision block 44. A decision error being the difference between the values Z and â, is finally produced at the output of subtracter 46.

$$\text{Expectation } E\{|Z(n) - a(n)|^2\} = E\{|e(n)|^2\} \rightarrow \min$$

Adjust device 40 of FIG. 1, includes in fact three identical circuits, receiving as input the delayed transmit signal at the input of the near echo estimator (output of delay 23 in FIG. 1), the delayed transmit signal at the input of the far echo estimator (output of delay 24 in FIG. 1) and the estimated far echo, for providing as outputs, the adjustments of respectively the near echo estimator coefficients, the far echo estimator coefficients and the phase rotating value.

Each circuit is composed of an interpolator (48-1, 48-2, 48-3) having the same coefficients as interpolator 36 (see FIG. 1) wherein the signal is resampled using Timing-2 derived from the incoming signal, a convolution circuit (50-1, 50-2, 50-3), wherein the interpolated signal is convolved with the current coefficients of equalizer 42, and a multiplying circuit (52-1, 52-2, 52-3) wherein the convolved signal is multiplied by the decision error, to obtain the update quantities for the echo estimator coefficients and the far echo phase, in fact, the result is used to update the two elements of a second order loop in which the first term is the integral phase-roll, and the second one is the instantaneous phase of the far-end echo.

The following description discloses how are derived the algorithms supported by the adjust device of FIG. 2.

The following equation shows explicitly the dependence of the signals in delay line X1 on the echo gain and equalizer gain, echo coefficients, and far-end echo phase, for $i = 0, 1$:

$$x_1(2n - 1 + i) = g_{EQZ} x_0(2n - 1 + i) - g_{ECH} g_{EQZ} \cdot \quad (2)$$

$$\left[\sum_{k=0}^{15} c_{NEC}(2k+i)a(n-k-D_{NEC}) + \sum_{k=0}^{31} c_{FEC}(2k+i)a(n-k-D_{FEC})e^{+j\phi FEC}\right].$$
$$= x_{NEC}(2n-1+i) \qquad = x_{FEC}(2n-1+i)$$

wherein a(m) is the signal symbol at the input of either the near echo estimator or the far echo estimator, m depending on the delay at the input of each estimator.

The signals in delay line X2 are obtained by the interpolation $$x_2(k) = \sum_j c_{INT}(j)x_1(k-j). \qquad (3)$$

It is useful to rewrite (2) explicitly for even and odd time indices in the form $$x_2(2n-1) = \sum_{j_2} c_{INT}(2j_2+1)x_1(2n-2j_2-2) + \qquad (4)$$
$$\sum_{j_1} c_{INT}(2j_1)x_1(2n-2j_1-1),$$
$$x_2(2n) = \sum_{j_1} c_{INT}(2j_1)x_1(2n-2j_1) +$$
$$\sum_{j_2} c_{INT}(2j_2+1)x_1(2n-2j_2-1).$$

The following equation defines interpolated near-end and far-end echo signals, $x_{2NEC}(k)$ and $x_{2FEC}(k)$:

$$x_2(k) = gEQZx_{2,0}(k) - gECHgEQZ[x_{2NEC}(k) + x_{2FEC}(k)].$$

Assume $$a_{NEC}(n) = a(n-D_{NEC}), a_{FEC}(n) = a(n-D_{FEC}).$$

Substitution of (2) into (4), and observing (5) and (6) yields $$x_{2NEC}(2n-1) = \sum_{k=0}^{15} \sum_{j_2} c_{INT}(2j_2+1)c_{NEC}(2k+1)a_{NEC}(n-j_2-1-k) +$$
$$\sum_{k=0}^{15} \sum_{j_1} c_{INT}(2j_1)c_{NEC}(2k)a_{NEC}(n-j_1-k),$$

$$x_{2NEC}(2n) = \sum_{k=0}^{15} \sum_{j_1} c_{INT}(2j_1)c_{NEC}(2k+1)a_{NEC}(n-j_1-k) +$$
$$\sum_{k=0}^{15} \sum_{j_2} c_{INT}(2j_2+1)c_{NEC}(2k)a_{NEC}(n-j_2-k),$$

$$x_{2FEC}(2n-1) = \sum_{k=0}^{31} \sum_{j_2} c_{INT}(2j_2+1)c_{FEC}(2k+1)a_{FEC}(n-j_2-1-k)e^{+j\phi FEC} + \qquad (8)$$
$$\sum_{k=0}^{31} \sum_{j_1} c_{INT}(2j_1)c_{FEC}(2k)a_{FEC}(n-j_1-k)e^{+j\phi FEC},$$

$$x_{2FEC}(2n) = \sum_{k=0}^{31} \sum_{j_1} c_{INT}(2j_1)c_{FEC}(2k+1)a_{FEC}(n-j_1-k)e^{+j\phi FEC} +$$
$$\sum_{k=0}^{31} \sum_{j_2} c_{INT}(2j_2+1)c_{FEC}(2k)a_{FEC}(n-j_2-k)e^{+j\phi FEC}.$$

These equations suggest the definition of interpolated echo symbols and an interpolated far-end echo signal:

$$b^0_{NEC}(n) = \sum_{j_1} c_{INT}(2j_1)a_{NEC}(n-j_1), \qquad (9)$$
$$b^1_{NEC}(n) = \sum_{j_2} c_{INT}(2j_2+1)a_{NEC}(n-j_2),$$
$$b^0_{FEC}(n) = \sum_{j_1} c_{INT}(2j_1)a_{FEC}(n-j_1), \qquad (10)$$
$$b^1_{FEC}(n) = \sum_{j_2} c_{INT}(2j_2+1)a_{FEC}(n-j_2),$$
$$x_{2FEC}(k) = \sum_j c_{INT}(j)x_{FEC}(k-j). \qquad (11)$$

Substitution of (9) into (7), and (10) into (8) yields $$x_{2NEC}(2n-1) = \sum_{k=0}^{15} [c_{NEC}(2k)b^0_{NEC}(n-k) + \qquad (12)$$
$$c_{NEC}(2k+1)b^1_{NEC}(n-k-1)],$$

$$x_{2NEC}(2n) = \sum_{k=0}^{15} [c_{NEC}(2k)b^1_{NEC}(n-k) +$$
$$c_{NEC}(2k+1)b^0_{NEC}(n-k)],$$

$$x_{2FEC}(2n-1) = \sum_{k=0}^{31} [c_{FEC}(2k)b^0_{FEC}(n-k) + \qquad (13)$$
$$c_{FEC}(2k+1)b^1_{FEC}(n-k-1)]e^{+j\phi FEC},$$

$$x_{2FEC}(2n) = \sum_{k=0}^{31} [c_{FEC}(2k)b^1_{FEC}(n-k) +$$
$$c_{FEC}(2k+1)b^0_{FEC}(n-k)]e^{+j\phi FEC}.$$

The output of the equalizer, generally written for 2N T/2-spaced taps, and the equalizer output counter-rotated by the estimated carrier phase, are given by $$y(n) = \sum_{j=0}^{N-1} [c_{EQZ}(2j)x_2(2n-2j) + \qquad (14)$$
$$c_{EQZ}(2j+1)x_2(2n-2j-1)], z(n) = y(n)e^{-j\phi CPH}.$$

Recall also the error signal, and the error signal rotated by the carrier phase:

$$e(n) = z(n) - a(n), f(n) = e(n)e^{+j\phi CPH}. \quad (15)$$

Observing (14), (15), and the influence of the estimated far-end echo phase on the equalizer output given by the earlier equations, leads to the direct-form gradients.

$$\nabla_{cNEC(k)}|e(n)|^2 = 2f(n)\frac{\partial y(n)}{\partial c_{NEC}(k)}*, k = 0, \ldots 31, \quad (16)$$

$$\nabla_{cFEC(k)}|e(n)|^2 = 2f(n)\frac{\partial y(n)}{\partial c_{FEC}(k)}*, k = 0, \ldots 63, \quad (17)$$

$$\nabla_{\phi FEC}|e(n)|^2 = 2Re\left\{f(n)\frac{\partial y(n)}{\partial \phi_{FEC}}*\right\} = \quad (18)$$

$$2Im\left\{f(n)\left[-j\frac{\partial y(n)}{\partial \phi_{FEC}}\right]*\right\}.$$

For the partial derivatives of y(n) one finds $$\frac{\partial y(n)}{\partial c_{NEC}(2l)} = -\gamma \sum_{j=0}^{N-1} [c_{EQZ}(2j)b_{NEC}^1(n-j-l) + \quad (19)$$

$$c_{EQZ}(2j+1)b_{NEC}^0(n-j-l)],$$

$$\frac{\partial y(n)}{\partial c_{NEC}(2l+1)} = -\gamma \sum_{j=0}^{N-1} [c_{EQZ}(2j)b_{NEC}^0(n-j-l) +$$

$$c_{EQZ}(2j+1)b_{NEC}^1(n-j-l-1)],$$

$$\frac{\partial y(n)}{\partial c_{FEC}(2l)} = -\gamma \sum_{j=0}^{N-1} [c_{EQZ}(2j)b_{FEC}^1(n-j-l) + \quad (20)$$

$$c_{EQZ}(2j+1)b_{FEC}^0(n-j-l)]e^{+j\phi FEC},$$

$$\frac{\partial y(n)}{\partial c_{NEC}(2l+1)} = -\gamma \sum_{j=0}^{N-1} [c_{EQZ}(2j)b_{FEC}^0(n-j-l) +$$

$$c_{EQZ}(2j+1)b_{FEC}^1(n-j-l-1)]e^{+j\phi FEC},$$

$$-j\frac{\partial y(n)}{\partial \phi_{FEC}} = j\gamma \sum_{j=0}^{2N-1} c_{EQZ}(j)\frac{\partial x_{2FEC}(2n-j)}{\partial \phi_{FEC}} e^{-j\phi CPH} = \quad (21)$$

$$\gamma \sum_{j=0}^{2N-1} c_{EQZ}(j)x_{2FEC}(2n-j),$$

where $\gamma = g_{ECH}g_{EQZ}$.

The calculation of the direct-form gradients is computationally intensive. It requires computation of the interpolated echo signals defined by (9), (10), and (11) for all times n, separate convolution of each of these signals with the equalizer coefficients, and at last, the multiplication of the resulting signals by the decision f(n) defined by (15), according to the functional block-diagram of FIG. 2.

These gradients are then used to update respectively the coefficients of the near echo estimator, the coefficients of the far echo estimator and the far echo phase, in order to minimize the mean-square decision error.

In fact modified gradients can be obtained by observing that individual product terms of gradients can be regrouped in time as long as the sum of the gradients over time remains unchanged. The derivation of modified gradients based on this principle is given below for the near-end echo coefficients.

Consider the unlimited sums over time n $$\frac{1}{2\gamma}\sum_n \nabla_{cNEC(2l)}(n) = -\sum_n f(n)\sum_{j=0}^{N-1}[c_{EQZ}(2j)b_{NEC}^1(n-j-l) + \quad (22)$$

$$c_{EQZ}(2j+1)b_{NEC}^0(n-j-l)]*,$$

$$\frac{1}{2\gamma}\sum_n \nabla_{cNEC(2l+1)}(n) =$$

$$-\sum_n f(n)\sum_{j=0}^{N-1}[c_{EQZ}(2j)b_{NEC}^{0*}(n-j-l) +$$

$$c_{EQZ}(2j+1)b_{NEC}^{1*}(n-j-l-1)]*.$$

Changing indices $n \to n+j, j \to N-1-j$ yields $$\frac{1}{2\gamma}\sum_n \nabla_{cNEC(2l)}(n) = \quad (23)$$

$$-\sum_n \sum_{j=0}^{N-1}[c_{EQZ}^*(2N-2-2j)f(n+N-1-j)b_{NEC}^{1*}(n-l) +$$

$$c_{EQZ}^*(2N-1-2j)f(n+N-1-j)b_{NEC}^{0*}(n-l)],$$

$$\frac{1}{2\gamma}\sum_n \nabla_{cNEC(2l+1)}(n) =$$

$$-\sum_n \sum_{j=0}^{N-1}[c_{EQZ}^*(2N-2-2j)f(n+N-1-j)b_{NEC}^{0*}(n-l) +$$

$$c_{EQZ}^*(2N-1-2j)f(n+N-1-j)b_{NEC}^{1*}(n-l-1)].$$

Equation (23) suggests the definition of error signals convolved with the conjugate-complex time-reversed equalizer coefficients, i.e., "matched-equalized" error signals:

$$g^0(n) = \sum_{j=0}^{N-1} c_{EQZ}^*(2N-2-2j)f(n-1-j), \quad (24)$$

$$g^1(n) = \sum_{j=0}^{N-1} c_{EQZ}^*(2N-1-2j)f(n-1-j).$$

Changing again indices $n \to n - N$ leads to $$\frac{1}{2\gamma}\sum_n \nabla_{cNEC(2l)}(n) = \sum_n \tilde{\nabla}_{cNEC(2l)}(n) \quad (25)$$

$$= \sum_n -[g^0(n)b_{NEC}^{1*}(n-N-l) +$$

$$g^1(n)b_{NEC}^{0*}(n-N-l)],$$

$$\frac{1}{2\gamma}\sum_n \nabla_{cNEC(2l+1)}(n) = \sum_n \tilde{\nabla}_{cNEC(2l+1)}(n)$$

$$= \sum_n -[g^0(n)b_{NEC}^{0*}(n-N-l) +$$

$$g^1(n)b_{NEC}^{1*}(n-N-l-1)],$$

where $\tilde{\Delta}_{cNEC(k)}(n)$ denotes the modified gradients.

This way to obtain modified gradients is represented on FIG. 3. Again, adjust device 40 of FIG. 1, includes three identical circuits receiving as inputs the delayed transmit signal used for the near echo estimator, the delayed transmit signal used for the far echo estimator and the estimated far echo. These three circuits provide as outputs, the adjustments of respectively the near echo estimator coefficients, the far echo estimator coefficients, and the phase roll-value.

First, the residual receive signal is interpolated by interpolator 36. The interpolated signal is then equalized in equalizer 42 to provide signal samples Z. After data detection, a data-symbol decision â is provided at the output of decision block 44. A decision error being the difference between the values Z and â, is produced at the output of subtractor 46. Differently from the implementation of FIG. 2, here, the decision error is convolved with the conjugate-complex time-reversed equalizer coefficients in the convolution circuit 60.

Each of the above-mentioned circuits of adjust device 40 comprises an interpolator (62-1, 62-2, 62-3) having the same coefficients as interpolator 36 wherein the signal is resampled using Timing-2 derived from the incoming signal. The interpolated signal is then delayed in a delay circuit (64-1, 64-2, 64-3), before being correlated in a correlation circuit (66-1, 66-2, 66-3) with the "matched equalized" error issued of convolution circuit 60.

As for the direct-form gradients obtained with the implementation of FIG. 2, the modified gradients resulting from the adjust device shown on FIG. 3, are used to update respectively the coefficients of the near echo estimator, the coefficients of the far echo estimator and the far echo phase, in order to minimize the mean-square decision error.

Though the invention has been described as being implemented in a digital signal processor which, in the today modems, performs all the data signal processing, it is in the skill of the man of the art using the teachings of the description, to implement the invention in hard-wired logic; therefore, what is claimed is:

1. An echo cancelling device in a data transmission system connected to a two-wire line portion of a transmission medium over which the transmission of an analog outgoing signal can be made simultaneously with the reception of an analog incoming signal, wherein said incoming signal is composed of a signal received from a remote system and a received echo signal, produced by said transmission medium in response to said outgoing signal, said data transmission system comprising a transmitter providing said outgoing signal and a receiver receiving said incoming signal and including an equalizer having an input and an output and data decoding means providing data-symbol decision; said echo cancelling device providing an estimated echo signal from said incoming signal and subtracting said estimated echo signal from said incoming signal, and comprising a near echo estimator for generating an estimated near echo signal, a far echo estimator for generating an estimated far echo signal, phase rotating means having an input and an output for rotating the phase of said estimated far echo signal in order to compensate for the phase roll distortion due to said transmission medium, and an adder for adding said estimated near echo signal and said phase-roll corrected signal at said output of said phase rotating means and thereby providing said estimated echo signal;

said echo cancelling device being characterized in that it further comprises:
an adjusting device for adjusting the coefficients of said near echo estimator, the coefficients of said far echo estimator and said phase rotating means while transmission of said outgoing signal is made simultaneously with the reception of said incoming signal, said adjusting device performing the minimization of a mean-square decision error obtained from the difference between the signal from an output of said equalizer, and said data-symbol decision.

2. The echo cancelling device according to claim 1 wherein:
functions performed by said transmitter, operations of said near echo and far echo estimators, and functions performed by said receiver for converting and filtering the incoming signal, are carried out using the transmitter timing (T1);
said data transmission system further comprises:
a subtractor means for subtracting said estimated echo signal from the said incoming signal; and
an interpolator for receiving the output of said subtractor and resampling said output by interpolation using the timing derived from the incoming signal (T2).

3. The echo cancelling device according to claim 1 or 2 wherein first, second and third signals, comprising, a first transmit signal at the input of said near echo estimator, a second transmit signal at the input of said far echo estimator and a third estimated far echo signal at the output of said far echo estimator, said first, second and third signals being provided as an input signal, to said adjusting device, said adjusting device comprising:
interpolation means for resampling said input signal by interpolation using the timing derived from said incoming signal (T2);
convolution means for convolving the interpolated signal with the coefficients of said equalizer; and
multiplication means for multiplying the resulting convolved signal with said decision error,
thereby providing, for each of said input signals, the adjustment of the respective coefficients of said near echo estimator, said far echo estimator and said phase rotating means.

4. The echo cancelling device according to claim 1 or 2 wherein for first, second and third signals, comprising, a first transmit signal at the input of said near echo estimator, a second transmit signal at the input of said far echo estimator and a third estimated far echo signal at the output of said far echo estimator, said first, second and third signals being provided as an input signal, to said adjusting device, said adjusting device comprising:
interpolation means for providing an interpolated signal by resampling said input signal by interpolation using the timing derived from said incoming signal (T2);
delay means for providing delayed interpolated signal by delaying said interpolated signal; and
correlation means for correlating said delayed interpolated signal with an equalizer error obtained by the convolution of a decision error with the time-inverse conjugate-complex sequence of the coefficients of said equalizer,
thereby providing, for each of said input signals, the adjustment of the respective coefficients of said near echo estimator, said far echo estimator and said phase rotating means.

* * * * *